(12) United States Patent
Voetmann et al.

(10) Patent No.: US 11,453,281 B2
(45) Date of Patent: Sep. 27, 2022

(54) SLAT CONNECTING SYSTEM FOR A ROLL-UP TRUCK BED COVER

(71) Applicant: MOUNTAIN TOP INDUSTRIES APS, Frederikssund (DK)

(72) Inventors: Thomas Rendbeck Voetmann, Jyllinge (DK); Peter Singer Hansen, Fredensborg (DK); Feigler Szabolcs, Copenhagen (DK)

(73) Assignee: MOUNTAIN TOP INDUSTRIES APS, Frederikssund (DK)

( * ) Notice: Subject to any disclaimer, the term of this patent is extended or adjusted under 35 U.S.C. 154(b) by 0 days.

(21) Appl. No.: 17/611,525

(22) PCT Filed: May 11, 2020

(86) PCT No.: PCT/EP2020/063028
§ 371 (c)(1),
(2) Date: Nov. 15, 2021

(87) PCT Pub. No.: WO2020/229401
PCT Pub. Date: Nov. 19, 2020

(65) Prior Publication Data
US 2022/0144056 A1 May 12, 2022

(30) Foreign Application Priority Data
May 16, 2019 (DK) .......................... PA 2019 70310

(51) Int. Cl.
*B60J 10/90* (2016.01)
*B60J 7/04* (2006.01)
*B60J 7/14* (2006.01)

(52) U.S. Cl.
CPC ............... *B60J 10/90* (2016.02); *B60J 7/041* (2013.01); *B60J 7/141* (2013.01)

(58) Field of Classification Search
CPC ... B60J 7/041; B60J 7/068; B60J 7/102; B60J 7/141; B60J 7/085; B60J 7/196;
(Continued)

(56) References Cited

U.S. PATENT DOCUMENTS

| 4,210,361 A | 7/1980 | Marvin et al. |
| 4,807,921 A | 2/1989 | Champie, III et al. |

(Continued)

FOREIGN PATENT DOCUMENTS

| AU | 2019100028 A4 | 2/2019 |
| DE | 2729235 A1 | 1/1979 |
| DE | 29906144 U1 | 10/1999 |

*Primary Examiner* — Gregory A Blankenship
(74) *Attorney, Agent, or Firm* — Fox Rothschild LLP (57) ABSTRACT

A slat connecting system is provided for a roll-up truck bed cover comprising an array of a plurality of contiguously arranged elongated slats. The elongated slats are pivotably hinged together, wherein an elongated slat comprises a main slat body having a first elongated edge and an opposite second elongated edge, a first elongated hinge member is provided in the vicinity of the first elongated edge along its length, and a second elongated hinge member is provided in the vicinity of the second elongated edge along its length, wherein the first elongated hinge member of a slat of the array of the plurality of contiguously arranged elongated slats is configured for being pivotably interconnected to the second elongated hinge member of the adjacent slat of said array.

18 Claims, 10 Drawing Sheets

(58) Field of Classification Search
CPC . B60J 7/198; B60J 7/067; B60J 7/1607; B60J 7/1621; B60J 10/90; B60P 7/02; B60P 7/04
USPC .................................. 296/98, 100.03, 100.09
See application file for complete search history.

(56) References Cited

U.S. PATENT DOCUMENTS

| | | | |
|---|---|---|---|
| 4,930,561 A | 6/1990 | Clay | |
| 4,972,894 A | 11/1990 | Machill | |
| 5,040,843 A * | 8/1991 | Russell | E06B 9/581 |
| | | | 296/100.09 |
| 5,330,246 A | 7/1994 | Bernardo | |
| 8,544,934 B2 * | 10/2013 | Maimin | B60J 7/102 |
| | | | 296/100.12 |
| 8,672,388 B2 * | 3/2014 | Rusher | B60J 7/085 |
| | | | 296/100.09 |
| 9,399,391 B2 * | 7/2016 | Bernardo | B60J 10/277 |
| 2013/0093206 A1 | 4/2013 | Rusher et al. | |
| 2013/0106133 A1 | 5/2013 | Maimin et al. | |
| 2013/0229027 A1 | 9/2013 | Copp et al. | |
| 2018/0147925 A1 * | 5/2018 | Williamson | B60J 7/141 |
| 2018/0147926 A1 * | 5/2018 | Shi | B60J 7/141 |
| 2020/0353805 A1 * | 11/2020 | Miaoyi | B60J 11/025 |
| 2021/0155086 A1 * | 5/2021 | Pattabhiraman | B60J 7/068 |
| 2021/0189793 A1 * | 6/2021 | Fowler | E06B 9/15 |
| 2021/0379973 A1 * | 12/2021 | Fu | B60J 7/198 |
| 2022/0144056 A1 * | 5/2022 | Voetmann | B60J 7/041 |

\* cited by examiner

SLAT CONNECTING SYSTEM FOR A ROLL-UP TRUCK BED COVER

CROSS REFERENCE TO RELATED APPLICATIONS

This application is a 371 filing of International Patent Application PCT/EP2020/063028 filed May 11, 2020, which claims the benefit of priority to Danish patent application no. PA 2019 70310 filed May 16, 2019, the disclosures of which are hereby incorporated by reference herein.

TECHNICAL FIELD

The present invention relates to a slat connecting system for a roll-up truck bed cover, comprising an array of a plurality of contiguously arranged elongated slats, and wherein the elongated slats are pivotably hinged together, wherein an elongate slat comprises a main slat body having a first elongated edge and an opposite second elongated edge, a first elongated hinge member is provided in the vicinity of the first elongated edge along its length, and a second elongated hinge member is provided in the vicinity of the second elongated edge along its length, the first elongated hinge member of a slat of the array of the plurality of contiguously arranged elongated slats is configured for being pivotably interconnected to the second elongated hinge member of the adjacent slat of said array.

In particular the present invention relates to a novel design of a slat for such a slat system.

BACKGROUND

Most roll-up truck bed covers are hard covers, often of the kind that can be rolled up on a shaft or drum due to the elongated slats being pivotably hinged together. The degree of pivoting sets the limit of the diameter of the rolled up truck bed cover.

Due to weight, water issues and price roll-up slat array covers may be the less preferred choice of truck bed cover in view of the cheaper and less heavy soft fabric cover systems. Furthermore, the connection between the adjacent slats of a roll-up truck bed cover may be vulnerable to passage of rainwater or melt water from melted snow into the bed of the truck.

But although roll-up truck bed covers are rather heavy by weight and thus to operate, they also offer many advantages over soft fabric covers, in particular better protection from theft, and by being more durable than soft fabric covers.

European Patent application no. 3177483 discloses a roll-up truck bed cover having an array of parallel aluminum slats joined together by connective hinges including leading and trailing edge configurations for improving the security of the cover by covering and concealing the seam between adjacent slats. The slats are joined to one another by means of flexible elongated seal members, and in the planar configuration of the array wherein the leading edge of a first slat is connected with the trailing edge of a second slat via the flexible elongated seal member said adjacent two slats overlap just slightly by a half lap splice joint that provides a redundant structural barrier covering and protecting the seam area disposed between said two adjacent slats. The leading edge is defined by an inverted step nib and the trailing edge is defined by an upright step nib, which step nibs constitute the half lap splice joint.

A disadvantage of the slat design of EP3177483 is that the only component to hold adjacent slats of the array together is the flexible joiner member. The slat array of EP3177483 has no direct hinge arrangement or connection between adjacent slats. During use, in particular after repeated opening and closing of the truck bed cover, the flexible joiner member has been subjected to substantial forces, such as stress, tension, wear and abrasion, resulting in increases risk of breaking, tearing, or failing of the flexible joiner member. If e.g. the flexible joiner member expands, shrinks or otherwise deforms the half lap splice joint may, as a result of the overlapping step nibs displacing either horizontally or vertically, thereby becoming open and uncovering the seam between adjacent slats, in which case a knife can easily cut through an exposed joiner member. In the slat design of EP3177483 these disadvantages are attempted to be solved by screwing an end cap inserted into the end of a slat to the end of flexible elongated seal member. However, this solution does only remove or reduce the risk of traverse shrinking of the flexible joiner member.

US patent publication no. 2013106133 relates to a roll up truck bed cover that includes a plurality of substantially rigid slats connected by hinge joints. A flexible sheet of material is attached to the top surface of the slats. The hinge joints include a stop which allows pivoting of adjacent slats only in a direction moving the top surfaces of the slats towards each other, to allow the cover to be rolled up with flexible sheet facing inwardly, and with bottom surfaces of the slats facing outwardly, and not vice versa.

U.S. Pat. No. 4,972,894 relates to a roller curtain formed of a plurality of interlocking curtain slats. Neighboring slats are joined together along their edges at a joint. An upper edge of an outer skin of a slat has a hook-like ridge directed toward an inner skin of the slat. A lower edge of the outer skin has a hook-like ridge directed toward the outer skin of the slat. The hook-like ridges of each neighboring slat engage to form the joint which connects neighboring slats. The curtain is assembled by inserting the hook-like ridges of each slat into one another.

SUMMARY OF THE INVENTION

It is a main aspect of the present invention to provide an improved slat and a slat array design that remedies the disadvantage of the prior art slats and slat array designs.

In yet another aspect of the present invention is provided a slat connecting system for a roll-up truck bed cover of the kind mentioned in the opening paragraph, wherein the slat connecting system provides an improved resistance to wear, to aging and/or exposure to temperature fluctuations.

In yet another aspect of the present invention is provided a slat connecting system for a roll-up truck bed cover of the kind mentioned in the opening paragraph, wherein the slat connecting system provides the truck bed cover with an improved dimensional stability.

In yet another aspect of the present invention is provided a slat connecting system for a roll-up truck bed cover of the kind mentioned in the opening paragraph, wherein the slat connecting system has an improved ability to be rolled-up and takes up minimum space in the rolled-up condition.

In yet another aspect of the present invention is provided a slat connecting system for a roll-up truck bed cover of the kind mentioned in the opening paragraph, wherein adjacent slats have a high resistance against being torn apart, e.g. upon operating the roll-up truck bed cover.

In yet another aspect of the present invention is provided a water-tight slat connecting system for a roll-up truck bed cover.

In yet another aspect of the present invention is provided a high-security slat connecting system for a roll-up truck bed cover.

In yet another aspect of the present invention is provided a slat connecting system for a roll-up truck bed cover of the kind mentioned in the opening paragraph, which slat connecting system has slats configured to control draining of water.

In yet another aspect of the present invention is provided a slat connecting system for a roll-up truck bed cover which is easy to install and has high vehicle compatibility.

In yet another aspect of the present invention is provided a light-weight roll-up hard truck bed cover.

The novel and unique whereby these and other aspects are achieved according to the present invention consist in that the first elongated hinge member has a first coupling groove member having a first groove opening facing away from the second elongated hinge member, the first coupling groove member extends into a coupling hook having a hook opening facing towards the second elongated hinge member, and wherein the first coupling groove member is closer to the main slat body than the coupling hook, the first coupling groove member is disposed at least partly laterally retracted from the first elongated edge below the main slat body and accommodates a part of the flexible elongated seal member which extends between adjacent slats.

Within the context of the present invention the terms "pivotably", "pivotal", and "pivot" used in relation to moving the first elongated hinge member and the second elongated hinge member in relation to each other means that any of the first elongated hinge member and the second elongated hinge member turns or rotates if adjacent interconnected slats bend are towards each other, e.g. when the truck bed cover is retracted and rolled up into a roll on a shaft or drum.

Within the context of the present invention the term "interconnected", and variations of this term, when used in relation to the first elongated hinge member and the second elongated hinge member, means that said first elongated hinge member and said second elongated hinge member are coupled in direct pivotal contact with each other. Thus, adjacent slats touch each other at said pivotally interconnected hinge members.

The interconnected first elongated hinge member of a slat and the second elongated hinge member of the adjacent slat provide a pivot connection of two adjacent slats in close proximity. The direct connection between the adjacent slats arranges the slats in close, contiguous extension of each other, and improves the ability for pivoting, turning and/or rotating two adjacent interconnected slats in relation to each other without said interconnected slats disconnecting.

A further advantage of directly hinging the first and second hinge members together is that when a pulling or drawing force is applied to the truck bed cover, to close and open access to the truck bed, the overall length of the truck bed cover remains substantially unaffected. A slat pulls or draws directly on the adjacent slat due to the direct connection and engagement between the contacting first elongated hinge member and second elongated hinge member.

Yet a further advantage is that said interconnection of the first elongated hinge member and the second elongated hinge member creates an effective barrier against penetration and cross-cutting, e.g. by means of a knife.

Advantageously the first elongated hinge member may extend from or close to the first elongated edge below the main slat body, the second elongated hinge member may extend from or close to the second elongated edge below the main slat body and be spaced apart from the first elongated hinge member, whereby the interconnected hinge members will be hidden inside the truck bed when the truck bed cover is in closed position over the truck bed, thereby obtaining that the top face of the truck bed cover has a planar and elegant look.

Advantageously, the space below the main slat body and between the first elongated hinge member and the second elongated hinge member is free and open, so that water and dirt cannot be collected.

The configuration of a first elongated hinge member can e.g. provide a cross-section being S-shaped, or being of laterally reversed S-shape, which kind of S-shape depends on the orientation of the slat. The upper channel delimited by the upper open curve of the S or reversed S delimits the first coupling groove member and the first groove opening, and the lower channel delimited by the lower curve of the S or reversed S delimits the coupling hook and the hook opening.

The second elongated hinge member may have a second coupling groove member having a second groove opening facing away from the first coupling groove member, whereby the coupling hook of one slat is configured to interconnect pivotably to the second coupling groove member of an adjacent slat.

The hook coupling of the first elongated hinge member of a first slat and the second coupling groove member of the second elongated hinge member of the adjacent slat are the primary means that together interconnect two adjacent slats. The hook coupling and the second coupling groove member link said slats together as an array or chain of adjacent slats. The main slat body of the slats for the roll-up truck bed cover of the present invention may have widths selected to leave no gap between the first elongated edge of a slat and the second elongated edge of the adjacent slat, thus said first elongated edge and said second elongated edge may be in edge-to-edge contact without the pivotability of the adjacent slats is negatively affected.

Such edge-to-edge contact may however be noisy, so instead a part of a flexible elongated seal member may be disposed between the first elongated edge of a slat and the second elongated edge of the adjacent slat.

In both embodiments the first coupling groove member accommodates a part of a flexible elongated seal member that extends between the adjacent slats, thereby placing as much as possible of the flexible elongated seal member below the main slat body to be inaccessible for cutting between the first elongated edge and the opposite second elongated edge.

So the slat connecting system for a roll-up truck bed cover may further comprise a plurality of flexible elongated seal members to improve the sealing property between adjacent slats, thereby also contributing in improving the strength of the direct interconnection of adjacent slats.

Advantageously a flexible elongated seal member may have a first seal section, which via a bridge member can extend into a second seal section, whereby the flexible elongated seal member may have two opposite enlarged sections coupled to each other by the bridge member. The first seal section may be configured to engage inside the first coupling groove member of a first elongated hinge member of a first slat, in which position the bridge member of said flexible elongated seal member is arranged to pass through the groove opening of said first elongated hinge member, resulting in that said second seal section protrudes outside the first coupling groove member and abuts the track member of the second elongated hinge member of the adjacent slat, at least when the main slat bodies of said adjacent slats are in substantially the same plane, to seal tightly against and between adjacent slats, in particular in embodiments wherein the first elongated edge of a first slat does not touch the second elongated edge of the adjacent slat when the main slat bodies are arranged in the same plane. When adjacent slats are pivoted so that a first elongated hinge member of a first slat and a second elongated hinge member of the adjacent slat are moved towards each other the flexible elongated seal member follows the movement of the first coupling groove member.

If an attempt, which is made to get access to the bed of a truck bed, which is closed by the roll-up truck bed cover of the present invention by cutting between slats, results in that the flexible elongated seal member is cut through, the attempter will subsequently be hindered in further cutting between adjacent slats by the obstacle constituted by the interconnected first elongated hinge member and second elongated hinge member.

In a preferred embodiment a track member can extend between the second coupling groove member and the interior surface of the main slat body so that the second seal section of the flexible elongated seal member can slide along the track member in the direction from the second coupling groove member towards the main slat body to act as a sealing flange that blocks for entry of water and dirt, even when adjacent slats are in the pivoted condition. The interconnected first coupling groove member and coupling hook have dimensions and shapes that allows only little or no ability to pull adjacent slats away from each other when adjacent slats are in the same plane. So, the flexible elongated seal member can easily be sized and dimensioned to resiliently about the track member to make a moveable, reliable seal against water penetration. Because the flexible elongated seal member follows the movement of the slat having the first coupling groove member the stress on said flexible elongated seal member are substantially reduced compared to the joiner member used in the roll-up truck bed covers of the prior art, e.g. as disclosed in European Patent application no. 3177483. Such known joiner members are firmly connected to opposite slat at opposite ends, and the bridge member is stretched and elongated every time adjacent slats are pivoted. The bridge member of the know joiner member will eventually break. Thus, the present invention provides flexible elongated seal members, which in the array system of the present invention has prolonged durability compared to the known joiner members, and thus contributes to make the truck bed cover more durable than hitherto known.

Even though the flexible elongated seal member is subjected to less stress and tension than the prior art joiner member, it might be preferred to make the flexible elongated seal member of a material having high shape-memory, so that the flexible elongated seal member easily reassumes its starting shape should it have been deformed.

At least one of the first elongated hinge member or the second elongated hinge member can extend laterally beyond the width of the main slat body to provide a large pivot radius.

The second seal section of the flexible elongated seal member may comprise an inner flange connected to the bridge member. The inner flange may be pressed against the exterior wall of the first coupling groove member by the force applied by the track member on the second seal section of said flexible elongated seal member, to fill and seal the gap, which exist below the main slat body of the first slat and above the interconnected hook member and the second coupling grove in the condition wherein adjacent slats are in substantially the same plane. The inner flange may, via a narrowed section, extend into a free flange terminating the second seal section, which free flange then may be the part of the second seal section that slidingly abuts the track member of the second elongated hinge member of the adjacent slat.

The inner flange and/or the outer flange may have lobed edges, where the lobes mate into corresponding recesses of the first elongated hinge member and second elongated hinge member to further secure the position of the flexible elongated seal member to the interconnected hinge members.

In a preferred embodiment the width of the free flange may be adapted so that a lobe of the free flange can extend into a gap between the first elongated edge of the main slat body of a first slat and the second elongated edge of the main slat body of the adjacent slat, at least when the main slat bodies of said adjacent slats are in the same plane. Preferably, such a lobe does not protrude beyond the exterior face of the main slat bodies but resiliently fills the gap between the adjacent slat edges, so that neither water nor dirt and small objects can get below the adjacent main slat bodies and pass towards the interconnected hook member and second coupling groove and let water get inside the truck bed or jam the pivotability of the array of slats.

It may be preferred that the first coupling groove member and the first seal section have mating and/or engaging shapes, e.g. circular cross-sections.

As an alternative or in addition to circular cross-sections the first coupling groove member may have interior coupling ribs and the first seal section may have corresponding exterior coupling ribs that fit into the gap between the interior coupling ribs, or vice versa.

The slat of the present invention may have one or more of
a flat exterior face of the main slat body to provide the truck bed cover with an elegant look, and make it particular easy to brush off matter from a closed cover, and to clean the cover,
a flat interior face of the main slat body to save material and make a very lightweight slat that cannot store water,
a bead or flange at one or more of the first elongated edge, the second elongated edge, an edge of the hook opening, an edge of the first coupling groove member, and an edge of the second coupling groove member to improve holding on to the flexible elongated seal member, and for maintaining securing and engagement between the components of the adjacent slats and/or the flexible elongated seal member,
the first coupling groove member may be disposed at least partly laterally retracted from the first elongated edge,
an enforcing web, which is disposed below the main slat body, may connect the first elongated hinge member and the second elongated hinge member, to confer further structural force to the slat and to the slat array; such an enforcing web may however require closure or plugging of the free ends of the slat by means of end caps or end walls to prevent water entering the hollowness defined between the interior surface of the main slat body, the enforcing web, the first elongated hinge member and the second elongated hinge member,
at least one drainage track may be provided crosswise the first elongated hinge member and/or the second elongated hinge member at, or close to, one or both of the free ends of a slat to divert e.g. rainwater on top of a slat into another drainage system, e.g. a drainage system provided in the guide rails that are mounted on or at the side walls of the truck bed to slidingly receive the free ends of the slats, the main slat body of a first slat does not touch the main slat body of the adjacent slat so that there is a small gap between the free ends of said main slat body to insert a seal member; thus the slats do not have step nibs, and the length of the flexible elongated seal member may be equal to the slat length, or the length of the flexible elongated seal member may be selected to be shorter than the length of a slat, e.g. having a length selected to extend between opposite drainage tracks.

The slat connecting system of the present invention may further comprise a clip adapted to be inserted between the first elongated hinge member and the second elongated hinge member. The clip advantageously serves to prevent the assembled adjacent slats from sliding in relation to each other along their longitudinal axes. The clip may also serve to prevent the slat from bending, thus to keep the distance between the first elongated hinge member and the second elongated hinge member, in particular when the roll-up truck bed cover is driven.

A main clip body that faces the main slat body of the slat when the clip and the slat are assembled spans the distance between the first elongated hinge member and the second elongate hinge member and constitutes a bridge part between a first clip end that is configured to engage the first elongated hinge member and an opposite second clip end that is configured to engage the second elongated hinge member so that the clip can be firmly fixed to the slat.

The first clip end may have a first clip leg provided by a bend extension of the main clip body and the second clip end may have a second clip leg provided by a bend extension of the main clip body opposite the first clip end. To ensure the required level of tension against the opposite elongated hinge members the first clip leg may have a curvature that conforms at least to some extent to the curvature of the first elongated hinge member, and if the second clip leg has a curvature that conforms at least to some extent to the curvature of the second elongated hinge member the clip fits well between said elongated hinge members. However it may be preferred that the first clip leg and the second clip leg are bend from the main clip body to diverge from each other and that the main clip body is so long that the first clip leg and the second clip leg applies tension to the respective elongated hinge members, whereby the clip can be fixed firmly below the slat's elongate hinge members.

The first clip end of the clip can have a first clip finger that protrudes from the main clip body above the first clip leg, and at the second clip end the clip can have a second clip finger that protrudes from the main clip body above the second clip leg. Said clip fingers may be snapped below the elongated hinge members so secured the position of the clip on the slat.

The second clip leg may be bifurcated so that the second drainage track is not covered by the second clip leg and stops water drainage.

It may be preferred that the first clip finger and/or the second clip finger curve away from the respective first clip leg and second clip leg, so that the first clip finger can mate along the exterior face of the first coupling groove member, and the second clip finger can reach through both the first coupling groove of the elongated first hinge member of the slat whereto the clip is mounted, and the coupling hook of the elongated second hinge member of the adjacent slat of the array of a plurality of contiguously arranged elongated slats The main clip body may be convex and have a convex surface facing the slat when assembled with said slat, so that the main clip body can apply a spring force on the opposite elongated hinge member to further ensure that the clip does not drop off when the roll-up truck bed cover moves.

The first clip finger and/or the second clip finger can in a preferred embodiment be configured to engage the at least one drainage track of the slat thereby efficiently preventing adjacent assembled slat from moving in relation to each other along their longitudinal axes, whereby the overall shape of the roll-up truck bed cover can be kept substantially square, and thus move smoothly when opened and closed.

BRIEF DESCRIPTION OF THE DRAWINGS

The invention will now be described in further details with reference to the drawing in which.

DETAILED DESCRIPTION OF THE INVENTION

A typical slat may be manufactured of aluminum or hard polymer. A typical flexible elongated seal member having shape memory can be made of rubber, such as silicone rubber, or any other material that can be extruded. Both the slat and the flexible elongated seal member can be manufactured by e.g. extrusion. The extruded profiles of slats and flexible elongated seal members are simply cut into appropriate lengths and numbers depending on the kind of truck and the design of the truck bed.

Although just two slats of the array of slats are shown in the figures it is to understand that plural contiguously arranged assembled elongated slats constitute the final array of slats of the truck bed cover. Actual number and size of the slats depends on the dimension of the truck bed.

Figure 1:
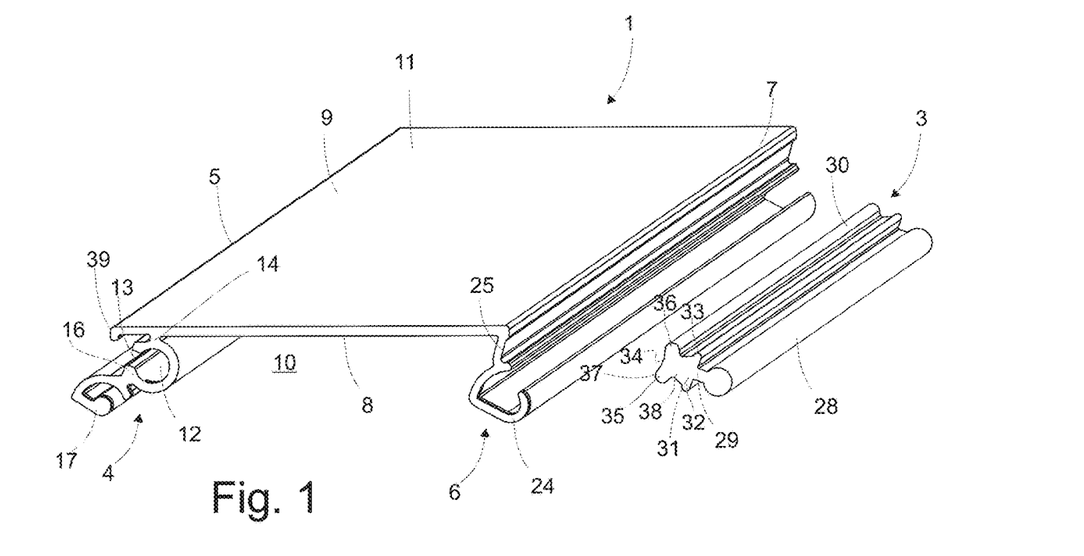
FIG. 1 is a perspective view seen from the end of an exemplary length of a first embodiment of a slat, and an associated first embodiment of a flexible elongated seal member.
Figure 5:
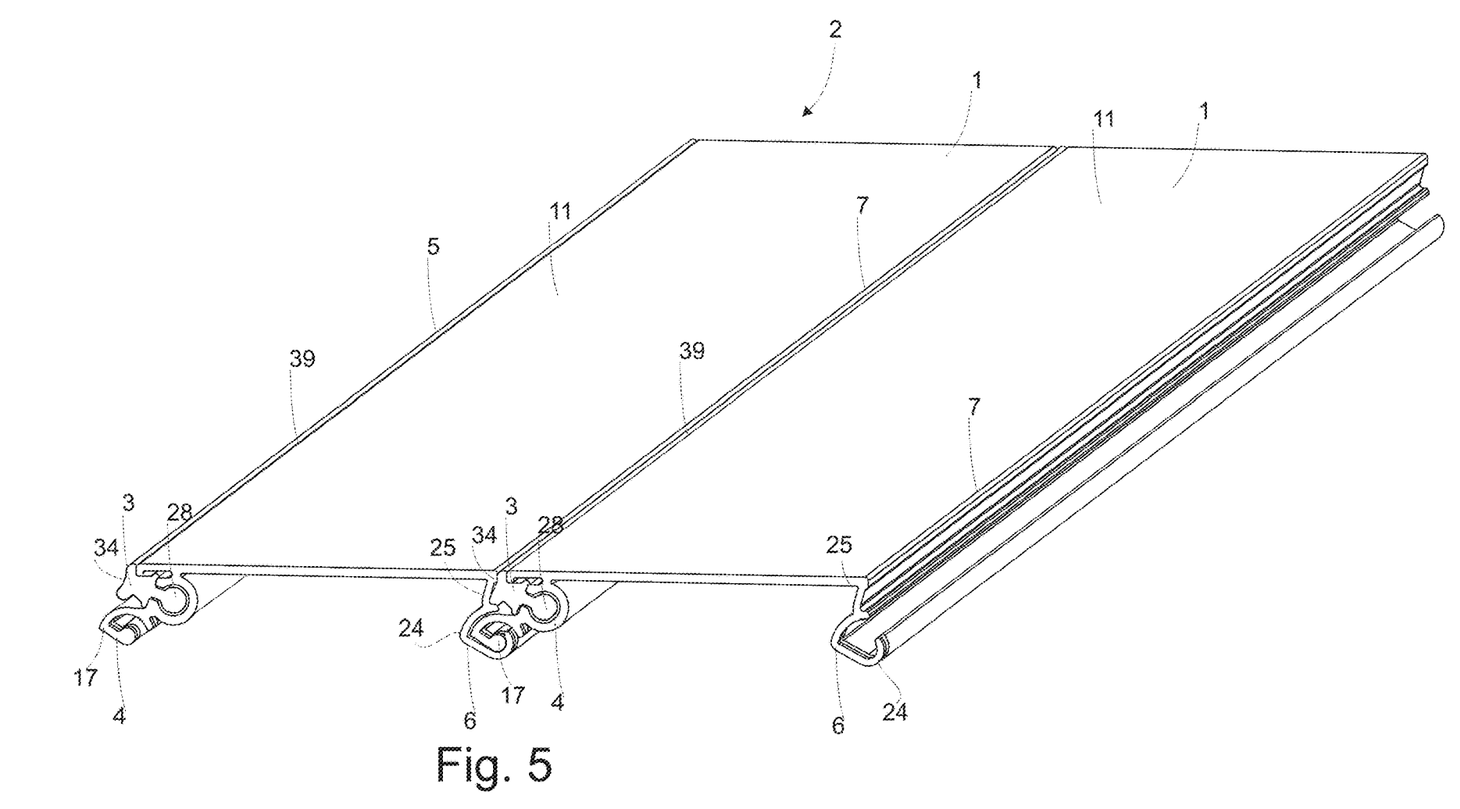

FIG. 1 shows a length of a first embodiment of a slat 1 and an associated first embodiment of a flexible elongated seal member 3, to be assembled into an array 2 of slats 1, as seen in FIG. 5.

The slat 1 has a first embodiment of a first elongated hinge member 4 provided along a first elongated edge 5 of the slat 1, and an opposite second elongated hinge member 6 provided along the second elongated edge 7 opposite the first elongated edge 5. The first elongated hinge member 4 and the second elongated hinge member 6 is suspended to an interior surface 8 of the main slat body 9, and extend below the main slat body 9 spaced apart from each other delimiting an open space or gap 10 between said hinge members 4,6. The exterior surface 11 are flat and planar, but can in the alternative be curved.

Figure 7:
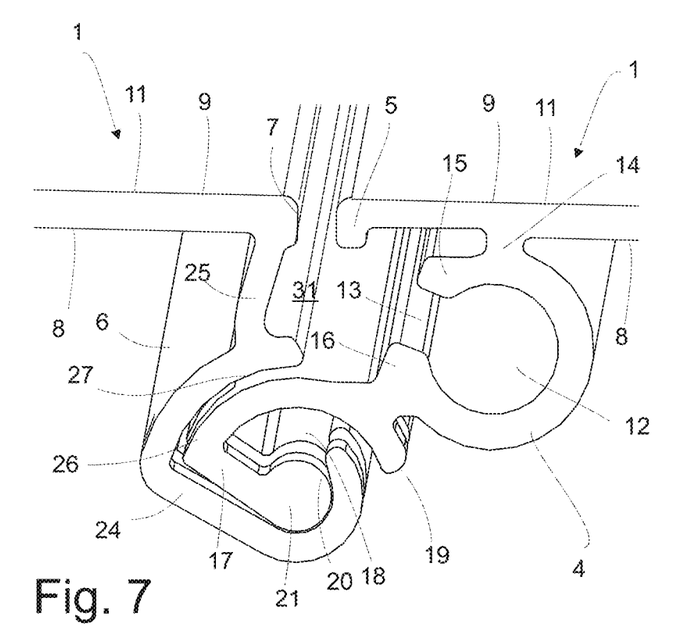
FIG. 7 is an enlarged scale, fragmentary view of an interconnected first elongated hinge member and second elongated hinge member of the first embodiment of a slat seen in FIG. 1.

The first elongated hinge member 4 and the second elongated hinge member 6 are seen in interconnected condition in the enlarged scale view of FIG. 7, thus without a flexible elongated seal member 3 is inserted.

The first elongated hinge member 4 has a first coupling groove member 12 with a groove opening 13. The first coupling groove member 12 has a substantially circular cross-section and is suspended to the interior surface 8 of the main slat body 9 by en elongate spacer web 14 to place the flexible elongated seal member 3 a distance from the main slat body 9.

The groove opening 13 is delimited by opposite upper groove edge 15 and lower groove edge 16. A coupling hook 17 extends from the first coupling groove member 12 in the vicinity of the lower groove edge 16. The coupling hook 17 is disposed at least partly laterally exposed beyond the first free elongated edge 5 substantially perpendicularly to said edge 5 in the directions towards an adjacent slat, and has a hook opening 18 facing the groove opening 13. The hook opening 18 is delimited by opposite upper hook edge and lower hook edge 20, which lower hook edge 20 has an enlargement in form of a lengthwise extending bead 21.

Figure 3:
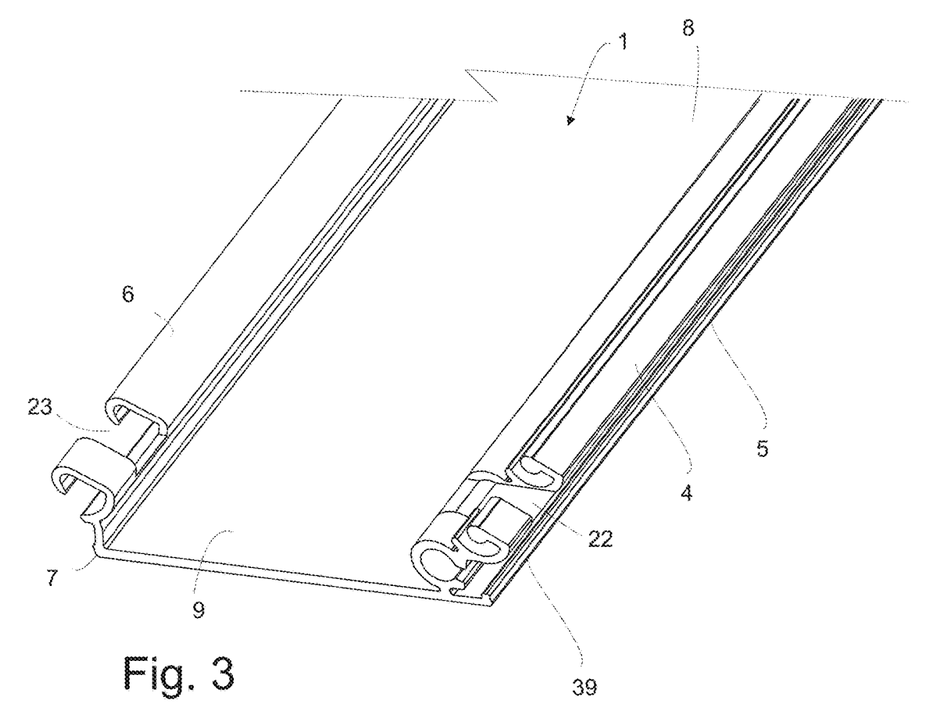
FIG. 3 shows the first embodiment of the slat seen in FIG. 1 but from the interior face, FIG. 4 a perspective view seen from the end of an exemplary length of a third embodiment of a slat of the present invention, FIG. 5 a perspective view of two contiguously arranged elongated slats of the first slat embodiment seen in FIG. 1, and being assembled along with the flexible elongated seal member, as also seen in FIG. 1; and wherein the main slat bodies of the adjacent slats are in substantially the same plane, as when the truck bed covers is in the closed condition, FIG. 6 corresponds to FIG. 5 but with the second embodiment of a slat assembled along with the second embodiment of a flexible elongated seal member, as shown in FIG. 2.

As seen best in FIG. 3 the first elongated hinge member 4 has a first drainage track 22 and the second elongated hinge member 6 has a second drainage track 23. The drainage tracks 22,23 allows water, such as rainwater hitting the exterior surface of the slat or melt water from melted snow, to escape into a drain channel in the side rail profile (not shown) used to mount the truck bed cover (not shown) in reciprocating manner on a truck bed. So, the drainage tracks 22,23 may be positioned in fluid communication with any drainage channel, e.g. be aligned with a drainage channel (not shown). The flexible elongated seal member 3 may extend the full length of a first elongated hinge member, or only until the drainage tracks 22,23. The flexible elongated seal member 3 is however normally so long that is extends below the side rails profiles mentioned above. The first drainage track 22 extends at least cross-wise an angular sector of the coupling hook 17. The second drainage track 23 extends at least cross-wise an angular sector of the second coupling groove member 24.

The drainage tracks 22,23 also stop water, which may collect on the underside of the slat 1 from either the side profile (not shown) or flat exterior face 11 of the main slat body 9 of the slat, from being able to travel down any lengthwise extending members on the underside of the slat 1, thereby stopping any water from dripping into the cargo area (not shown). Water will instead drip off the edge of the hinge members 4,6. The drainage tracks 22,23 are cut crosswise the hinge members 4,6.

The second elongated hinge member 6 has a second coupling groove member 24 suspended to the interior face of the main slat body 9 of the slat 1 via a track member 25 at or close to the second elongated edge 7. The second coupling groove member 24 is the female coupling part that pivotably accommodates the male coupling part in form of the coupling hook 17. The interior curvature of the second coupling groove member 24 conforms to the exterior curvature of the coupling hook 17, so that when adjacent slats 1 are pivoted towards each other the exterior surface 26 of a coupling hook 17 slides on the interior surface 27 of the second coupling groove member 24 to allow the assembled array 2 of slats 1 to achieved a rolled-up condition. The pivot angle a between adjacent slats 1 can e.g. change between 0°, where the main slat bodies 9 are in the same plane, and 90°, without the coupling hook 17 disconnect the second coupling groove member 24.

The first embodiment of a flexible elongated seal member 3, which is shown in perspective and separate from the slat 1 in FIG. 1, has a first seal section 28, which, via a bridge member 29, extend into a second seal section 30.

The first seal section 28 fits inside the first coupling groove member 12, so that the bridge member 29 protrudes via the groove opening 13 so that the second seal section 30 protrudes there from. As a result of this protrusion the flexible elongated seal member 3 remains anchored in the first coupling groove member 12 so that the second seal section 30 resiliently abuts the track member 25, as seen in FIG. 5, to seal between adjacent slats 1, e.g. to seal between the first elongated edge 5 and the second elongated edge 7, and so that the second seal section 30 at least partly fills the remaining cavity 31 that overall are defined above the coupling hook 17, below the interior surfaces 8 of the main slat bodies 9, the track member 25, the upper groove edge 15 and the lower groove edge 16.

The cross-section of the first seal section 28 is circular to fit inside the circular cavity of the first coupling groove member 12. The bridge member 29 has a thickness fitting the groove opening 13. The cross-section of the second seal section 30 is quatrefoil or quatrelobe, wherein an inner flange 31 that is fastened in extension of the bridge member 29 has rounded opposite free first end lobes 32,33, and a free flange 34, that is provided at the free end 35 of the second seal section 30, has rounded opposite free second end lobes 36,37 and is in extension to the inner flange 31 via a narrowed section 38.

The first embodiment of a flexible elongated seal member 3 is substantially symmetrical about a traversing axis through the first seal section 28 and the second seal section 30 and perpendicular to the longitudinal axis of the flexible elongated seal member 3.

In the assembled slat of adjacent slats 1, the inner flange 31 rests on the exterior face of the first coupling groove member 12 next to the upper groove edge 15 and the lower groove edge 16. The free flange 34 abuts the track member 25 so that the uppermost free second end lobe 36 becomes located between the first free edge 5 and the second free edge 7 of respective adjacent slats 1. A flange 39 on the first free edge 5 faces the coupling hook 17, and serves to press and squeeze the free second end lobe 36 against the second free edge 7, in particular when a slat 1 is moved in the left direction when seen in the orientation seen in FIG. 1, whereby the free second end lobe 36 fully occupies any space between the flange 39 and the second free edge 7.

Figure 2:
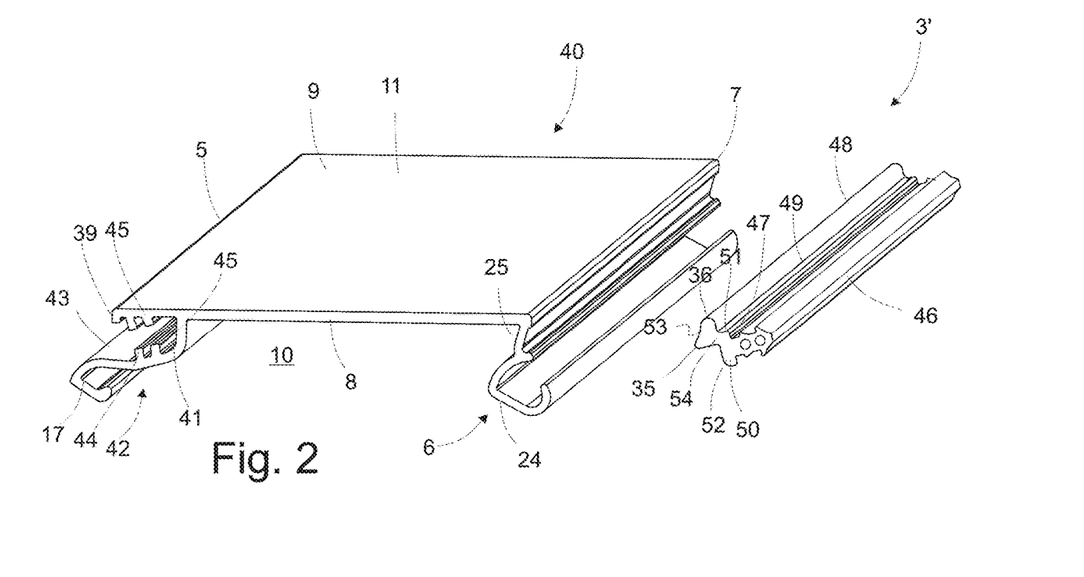
FIG. 2 is a perspective view seen from the end of a second embodiment of an exemplary length of a slat of the present invention.

FIG. 2 is a perspective view seen from the end of a second embodiment of an exemplary length of a slat 40 and of second embodiment of a flexible elongated seal member 3'.

The second embodiment of a slat 40 corresponds substantially to the first embodiment of a slat 1, and for like parts same reference numerals are used.

The slat 40 differs from the slat 1 only in that the first coupling groove member 41 of the first elongated hinge member 42 is different.

The groove opening 43 of the first coupling groove member 41 of the slat 40 is larger than the groove opening 13 of the first coupling groove member 12 of the slat 1, so to avoid that the second embodiment of a flexible elongated seal member 3' is torn out of the first coupling groove member 41, the interior face 44 of said first coupling groove member 41 has opposite protruding interior elongated first coupling ribs 45.

An upper groove edge 45 is constituted by the flange 39, and the lower groove edge 16 of the first embodiment of a slat 1 is in the second embodiment of a slat 40 constituted by the lower most exterior coupling rib 44, which is positioned at the transition between the first coupling groove member 41 and the hook coupling 17.

The first seal section 46 of the second embodiment of a flexible elongated seal member 3' differs from the first embodiment of a flexible elongated seal member 3 in that the cross-section is not circular, but rather the cross-section is an elongated stylized Christmas tree or barbed rectangle with protruding second coupling ribs 47 that engage between the first coupling ribs 45 when the flexible elongated seal member 3' is inserted into the first coupling groove member 41.

A further difference is that the flexible elongated seal member 3' is not symmetrical about a traversing axis through the first seal section 46 and the second seal section 48.

The bridge member 49 extends into the inner flange 50, that has free first end lobes 51,52. The free first end lobe 51 closest to the main slat body 9 extends into the free flange 53 via a narrowed section 54. The free flange 53 has free second end lobes 35,36.

Figure 6:
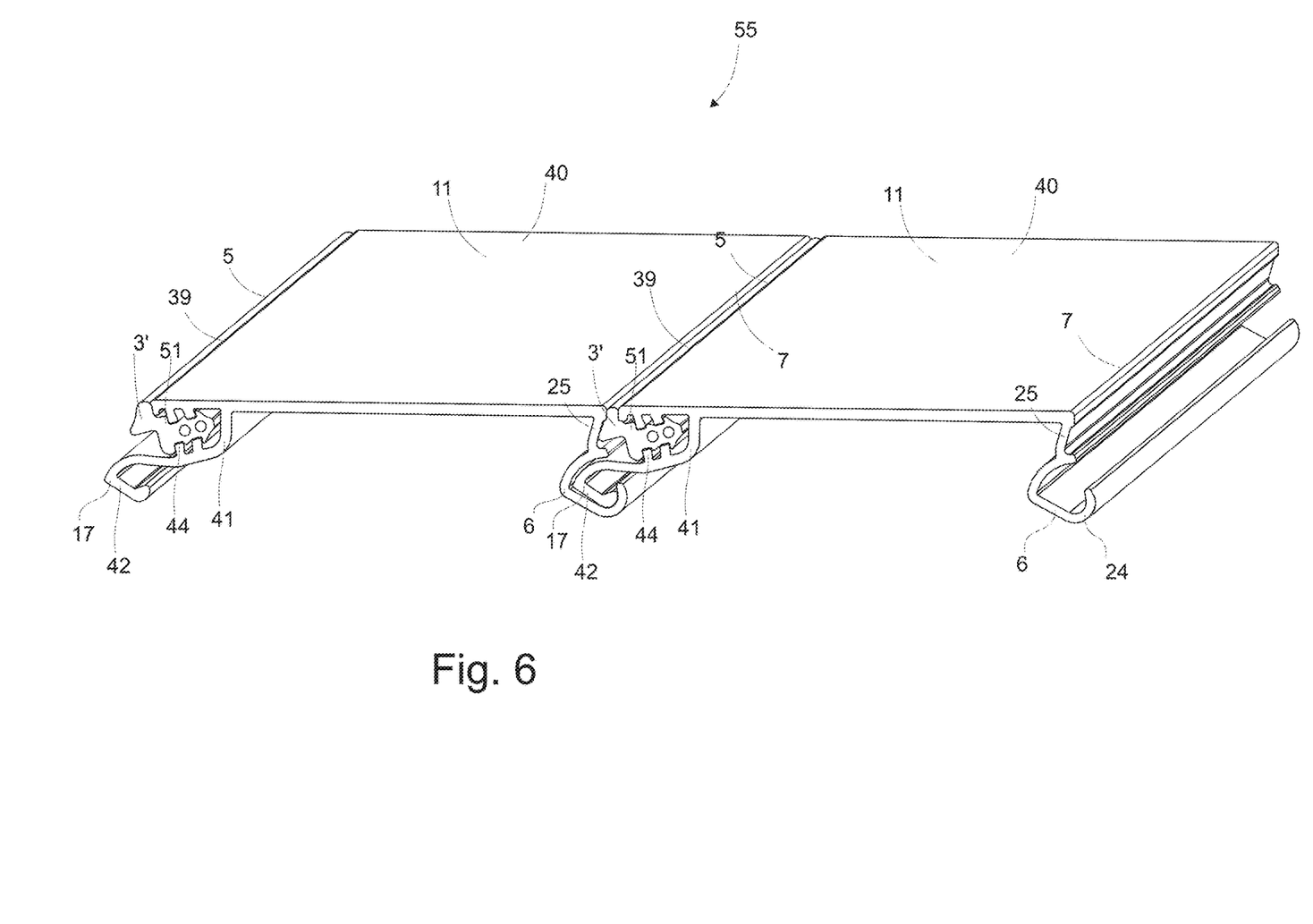

As shown in FIG. 6 the slats 40 are assembled into an array 55 of slats 40 and the flexible elongated seal members 3' are inserted between adjacent slats 40 so that the free first end lobe 51 extends between the flange 39 and the second elongated edge of the adjacent slat 40.

Figure 8:
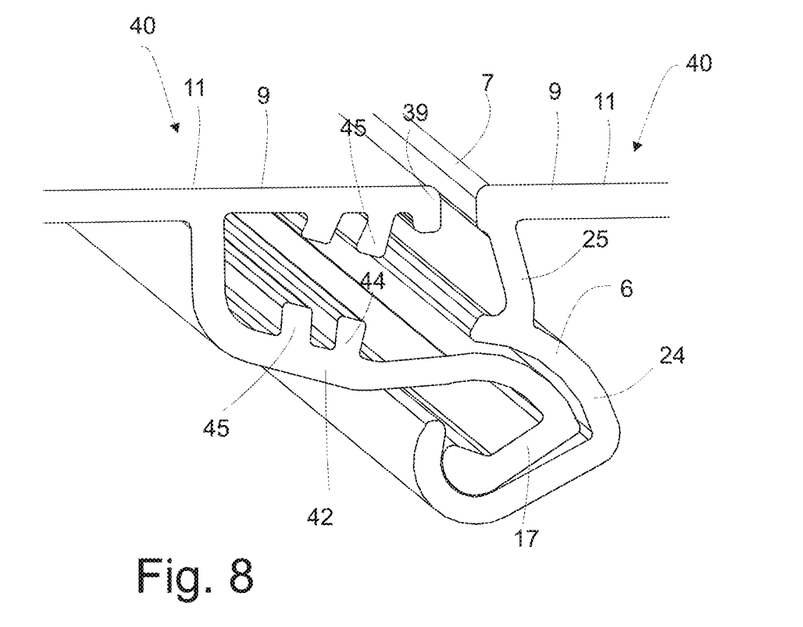
FIG. 8 is an enlarged scale, fragmentary view of an interconnected first elongated hinge member and second elongated hinge member of the second embodiment of a slat seen in FIG. 2.

The interconnection between the hook coupling 17 and the second coupling groove member 24 corresponds to the interconnection of same for the first embodiment of a slat 1, as seen in FIG. 8.

Figure 4:
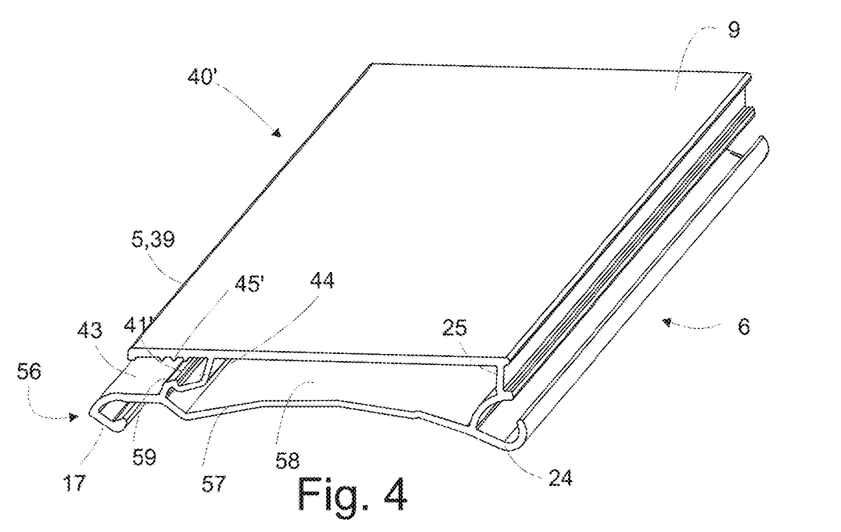

FIG. 4 shows a third embodiment of a slat 40' corresponds to the salts 1 and 40 and for like part same reference numerals are used.

The second elongated hinge member 6 are the same but the first elongated hinge member 56 is a slightly modified version of the first elongated hinge member 42 of the second embodiment of a slat 40. A reinforcing web 57 extends between the second elongated hinge member 6 and the first elongated hinge member 56 at a distance from the main slat body 9 which delimits a lengthwise extending channel 58. The channel 58 can be filled with insulation material and/or the slat 40' may have end caps (not shown) inserted to close the open ends. The reinforcing web 57 is slightly inverted thereby being configured with a curvature that provides a compact roll of slats in the rolled-up retracted position of the truck bed cover.

The interior face 44 of the modified first coupling groove member 41' only has protruding elongated first coupling ribs 45' extending from the interior face 8 of the main slat body 9 in the vicinity of the flange 39. The lower groove edge 59 serves as an opposite first coupling rib.

Figure 9:
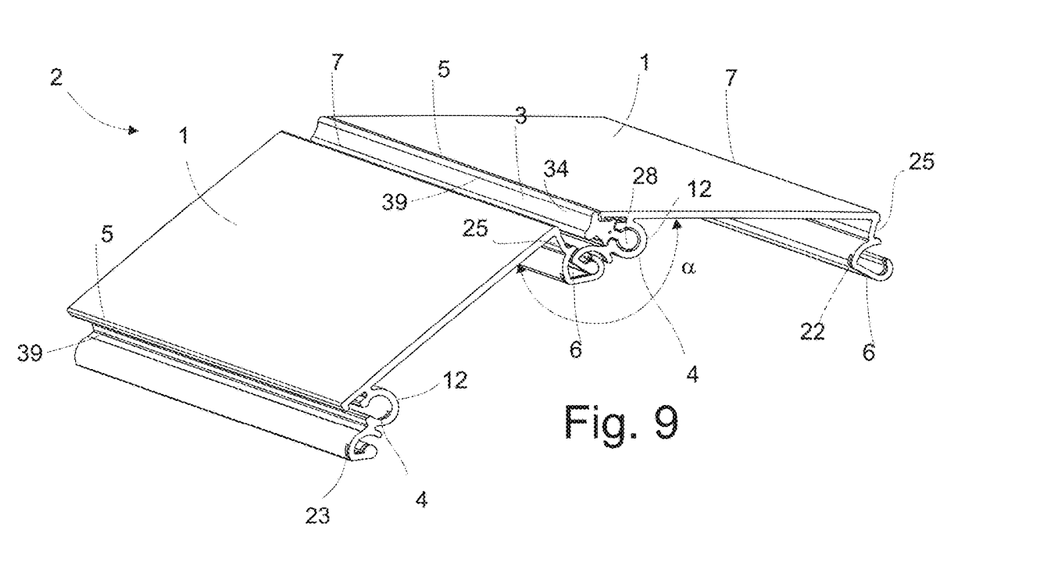
FIG. 9 shows two contiguously arranged assembled elongated slats of the first embodiment of a slat, as seen in FIG. 5, but wherein the two contiguously arranged elongated slats are bend an angle of 40°.

FIG. 9 shows two contiguously arranged assembled elongated slats of the first embodiment of a slat 1 seen in FIG. 5. The two contiguously arranged elongated slats 1 are bend an angle α of 40°.

Figure 10:
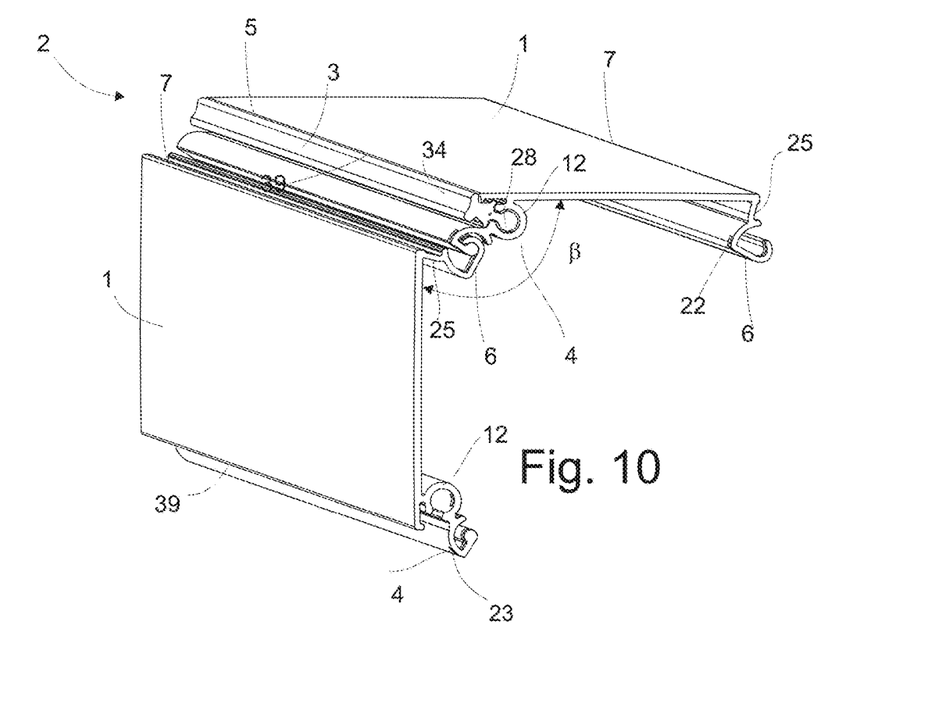
FIG. 10 shows the same but wherein the two contiguously arranged elongated slats are bend an angle of 90°.

FIG. 10 shows the same but wherein the two contiguously arranged elongated slats are bend an angle β of 90°.

The axially symmetrical flexible elongated seal member 33 cannot be assembled/disassembled at any angle between the two contiguously arranged assembled elongated slats 1 and is therefore typically inserted into the first coupling groove member 12 by sliding along its length.

The bending angles α, β can vary without the contiguously arranged assembled elongated slats 1 get apart due to the interconnection of the first hinge member 4 and the second hinge member 6. In the bend condition, which the two contiguously arranged assembled elongated slats 1 assume when the array of slats 1 are rolled up, e.g. on a shaft inside a canister, the free flange 35 of the flexible elongated seal member 3 is free of contact with the guide track 25 of the adjacent slat 1. The flexible elongated seal member does not engage in the interconnection of the contiguously arranged assembled elongated slats 1.

Figure 11:
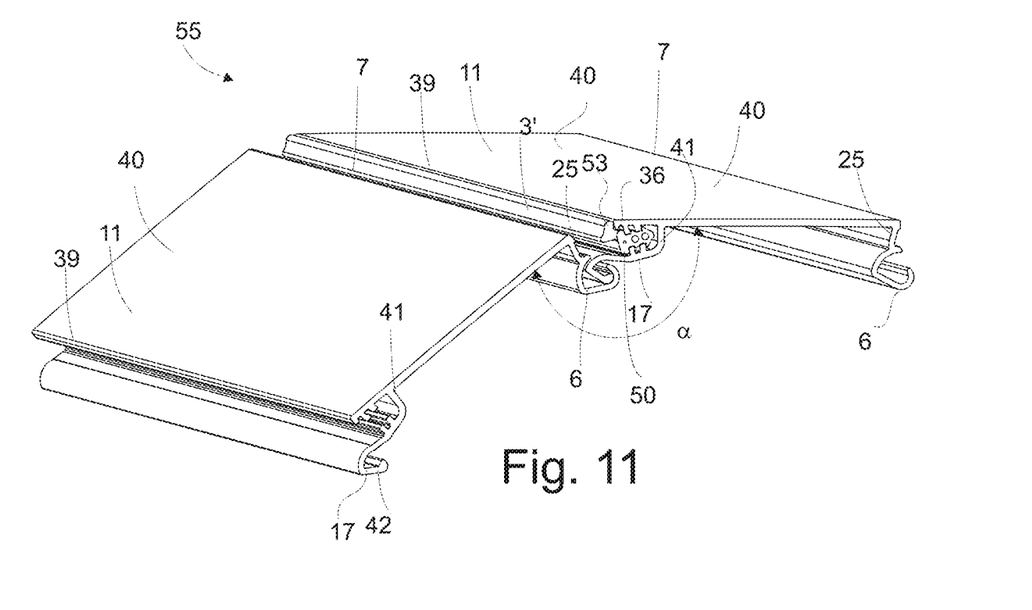
FIG. 11 shows two contiguously arranged assembled elongated slats of the second embodiment of a slat, as seen in FIG. 6, but wherein the two contiguously arranged elongated slats are bend an angle of 40°.

FIG. 11 shows two contiguously arranged assembled elongated slats of the second embodiment of a slat 40 seen in FIG. 6. The two contiguously arranged elongated slats 40 are bend an angle α of 40°.

Figure 12:
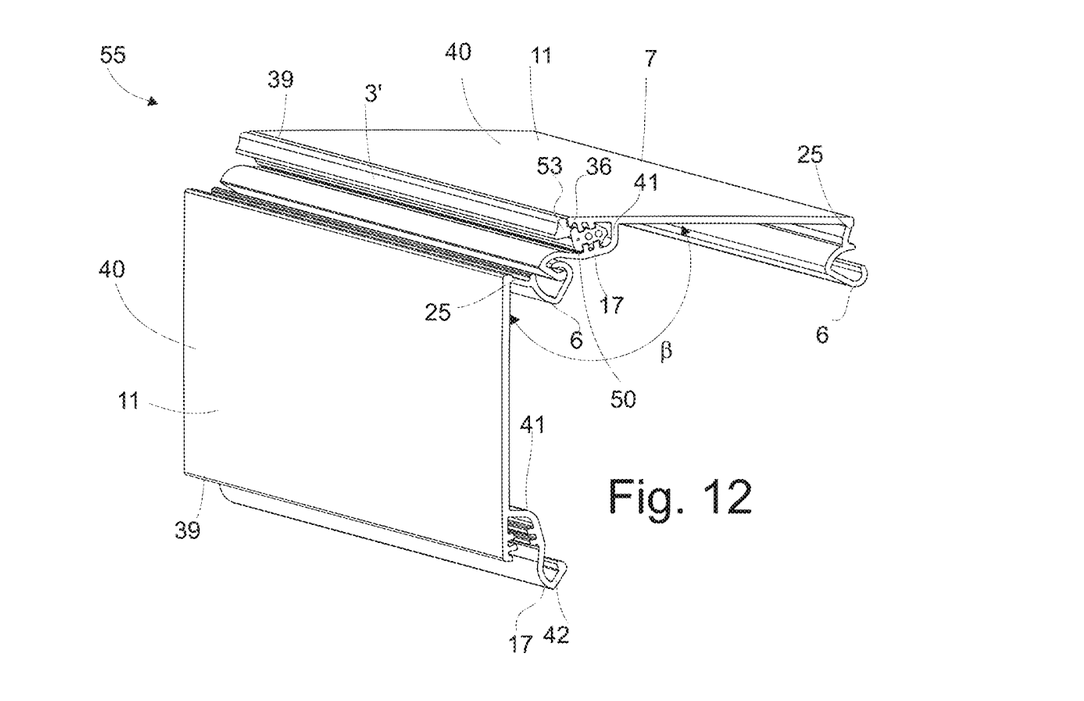
FIG. 12 shows the same but wherein the two contiguously arranged elongated slats are bend an angle of 90°.

FIG. 12 shows the same but wherein the two contiguously arranged elongated slats 40 are bend an angle β of 90°.

The flexible elongated seal member 3' is axially asymmetrical and can be assembled/disassembled with the slats 3' when the bend angle is 90° but can also be assembled/disassembled by sliding the contiguously arranged elongated slats 40 together along their length.

The flexible elongated seal member 3' does not engage in the interconnection of the contiguously arranged assembled elongated slats 40.

Figures 13, 14:
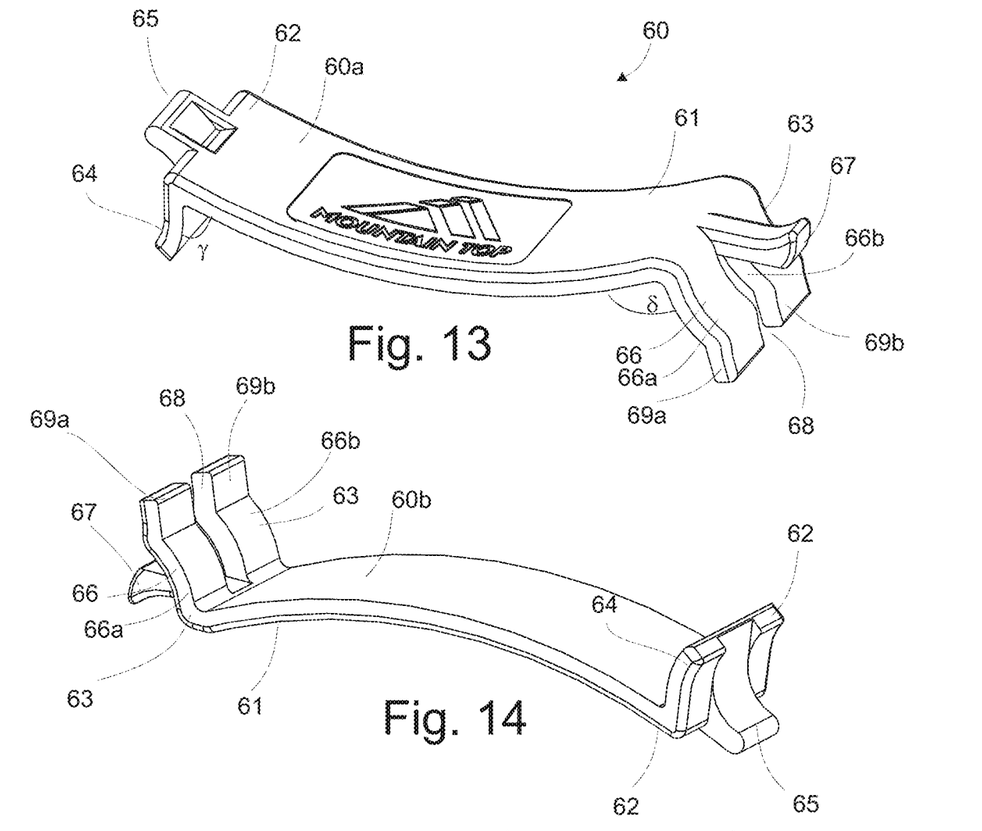
FIG. 13 shows in perspective a clip from a concave surface of the main clip body of said clip.
FIG. 14 shows the same seen from the convex surface of the main clip body.

FIG. 13 shows from a concave surface 60a, and in perspective, a clip 60 to be mounted below a slat 1, and FIG. 14 shows the same seen from a convex surface 60b. The clip has a main clip body 61. Emphasize is made that below the clip is described in relation to the first embodiment of a slat 1, but the clip can be used with the second embodiment of a slat 40 as well.

Since the slat 1 has no bottom wall it may, e.g. depending on thickness of goods and width, have a certain degree of resiliency. This resiliency may be preferred to be restricted while at the same time keeping the slat very light and preventing adjacent slats from moving along their longitudinal axes in relation to each other.

Figure 15:
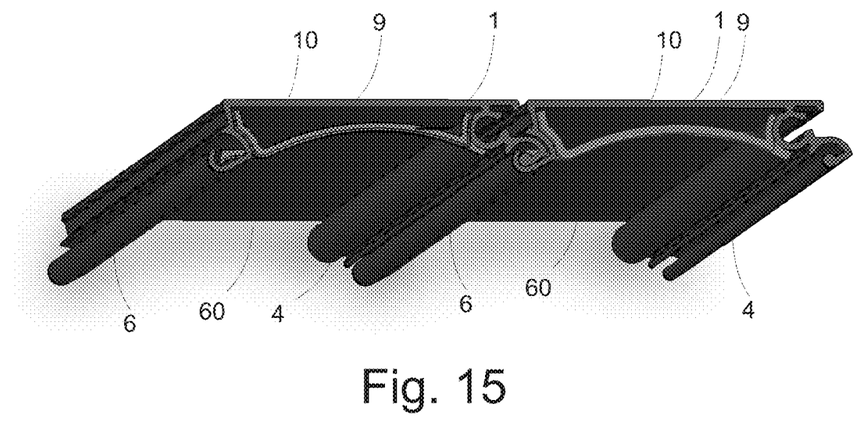
FIG. 15 shows in perspective two contiguously arranged and assembled elongated slats without seal members but provided with the clip shown in FIGS. 14 and 15.
Figure 16:
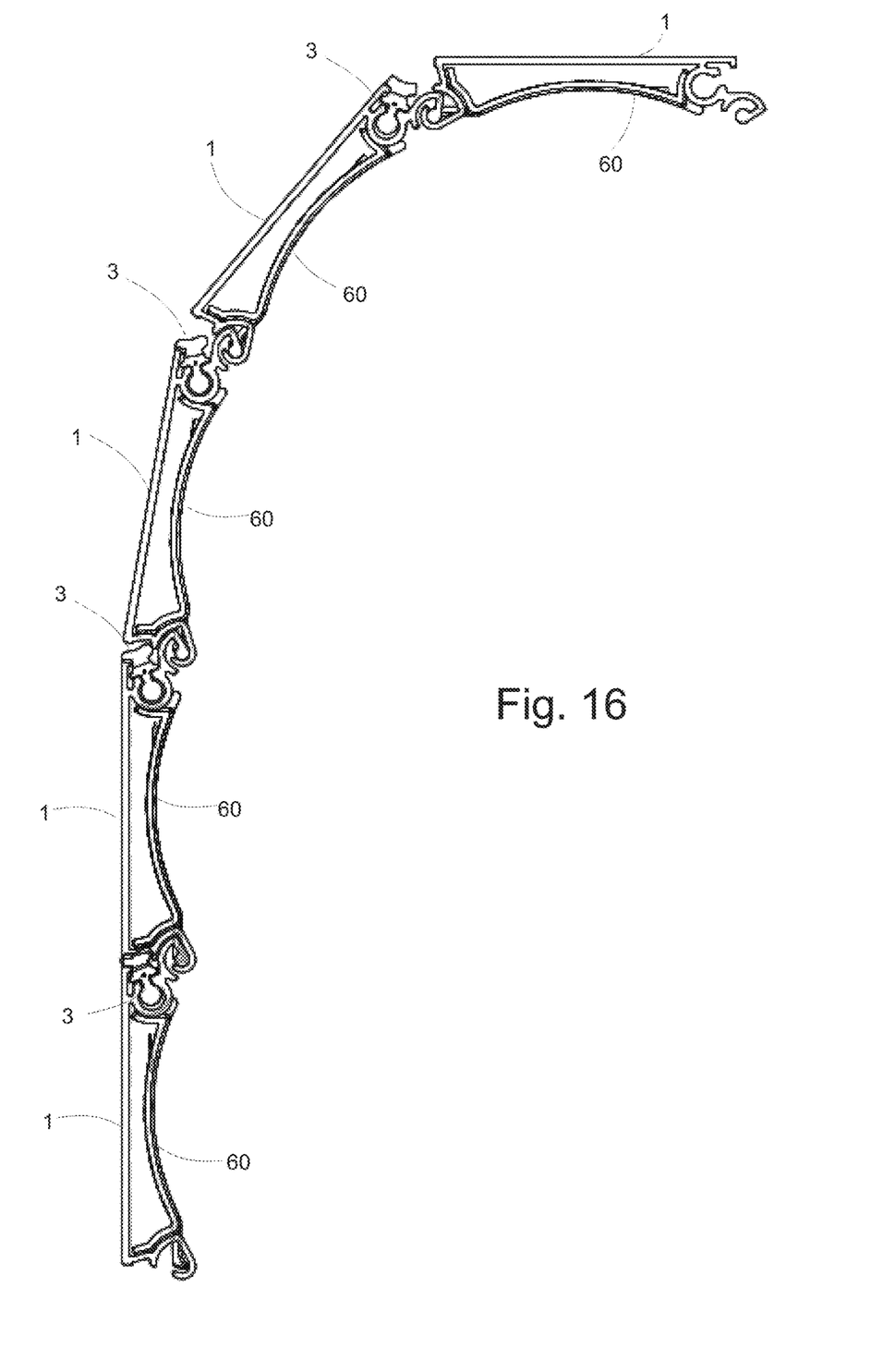
FIG. 16 shows seen from the side five contiguously arranged and elongated slats assembled with seal members in between and provided with clip shown in FIGS. 14 and 15 inserted below the slat.
Figure 17:
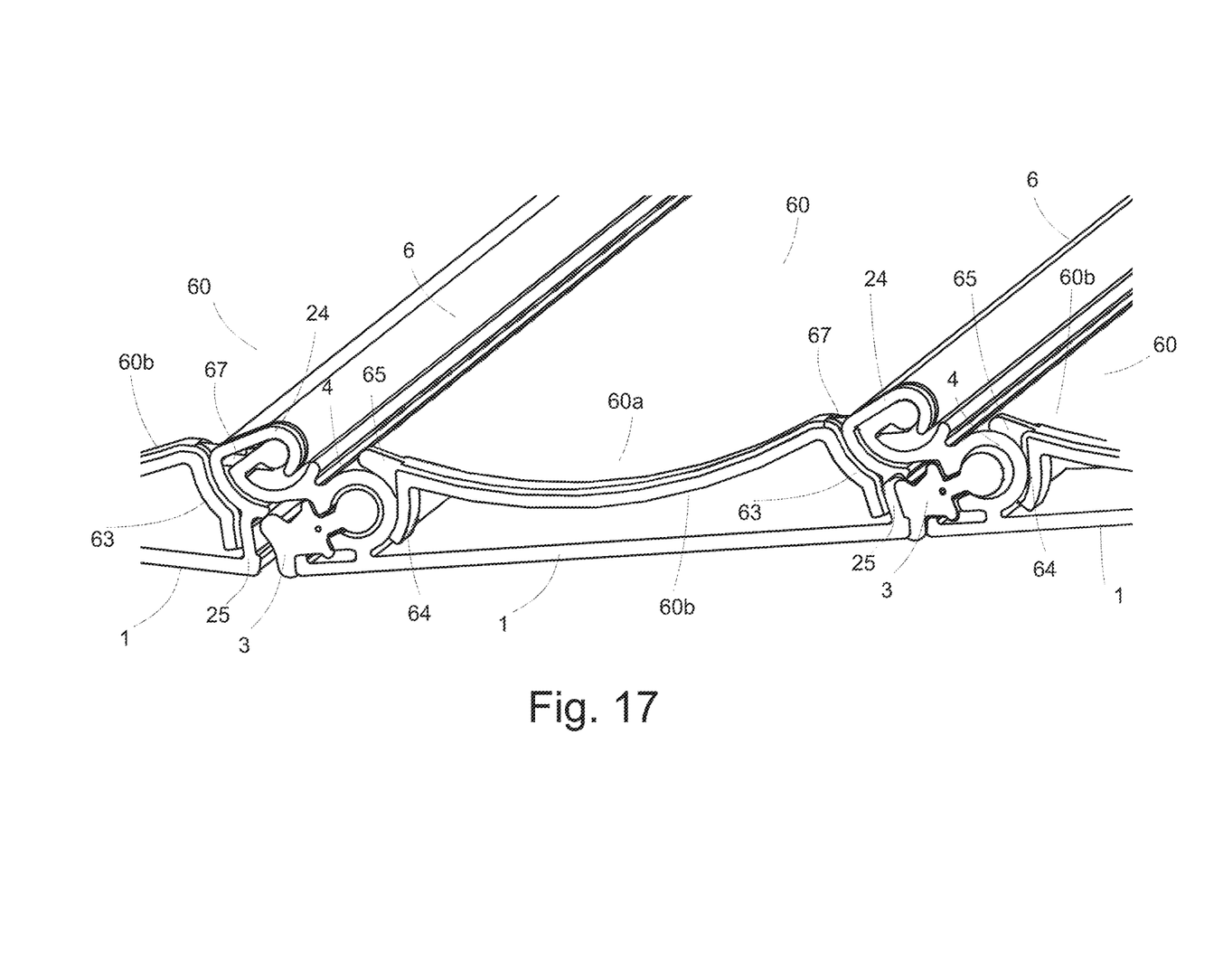
FIG. 17 is an enlarge scale fragmentary side view seen slightly from below the roll-up truck bed cover of the assembling of slat and clip.

For these purposes the clip 60 may be inserted in the gap 10 between the first elongated hinge member 4 and the second elongated hinge member 6, as seen in FIGS. 15, 16 and 17, and kept in place in said gap 10 tensioned by said hinge members.

The clip 60 has a main clip body 61. The main clip body has a first clip end 62 and an opposite second clip end 63. The main clip body 61 is bend, whereby the clip 60 has an arched curvature, a convex surface 60b, that curves towards the main slat body 9 when the clip 60 is mounted to the slat 1, as seen in e.g. FIG. 15, whereby the clip 60 is put under tension by the slat 1, and vice versa. The distance between the main slat body 9 and the main slat body 9 is thus shorter at the middle of said bodies 9; 61 than at their respective opposite ends, but since the clip 60 is detachable access to the underside of the slat 1 is not hindered. The clip 61 applies a force on the first elongated hinge member 4 at the first clip end 62 and on the second elongated hinge member 6 at the opposite second clip end 63 to make the assembly of clip 60 and slat 1 a dimensional strong structure for the roll-up truck bed cover.

When the clip 60 is snap-fitted to the slat 1 the first clip end 62 is force-fitted to abut against the exterior face of the first coupling groove member 12, and the second clip end 63 is force-fitted to abut against the second coupling groove member 24, as seen best in FIGS. 15 and 16.

To that aspect the first clip end 62 has a first clip leg 64 that via a first angle γ constitutes a turnover of the main clip body 61. Due to its material properties, the first angle γ, and the length of the main clip body 61 the first clip leg 64 has inherent spring properties and is able to apply a securing force on the slat 1. A protruding first clip finger 65 is provided in extension of the main clip body 61 and protrudes beyond the first clip leg 64. The first clip finger 65 can fit inside the first drainage track 22 of a first slat but need not do so.

The second clip end 63 has a bifurcated second clip leg 66 that via a second angle δ constitutes a turnover of the main clip body 61 opposite the first clip end 62. Due to its material properties, the second angle δ, and the length of the main clip body 61 the second clip leg 63 also has inherent spring properties and is able to apply a securing force on the slat 1. A protruding second clip finger 67 is provided in extension of the main clip body 61 at the second clip end 63 and protrudes beyond said second clip leg 64 to fit inside the second drainage track 23 of the slat and the first drainage track 22 of the adjacent drainage track to keep said drainage tracks 22; 23 aligned, and as a result preventing the slats 1 from sliding axially in relation to each other.

FIG. 17 shows a fragment of the slats 1 for a roll-up truck bed cover 70 seen in FIG. 16. Adjacent assembled slats can then pivot about the second clip finger 67, as illustrated is the enlarged scale fragmentary side view seen slightly from below of the assembling of three adjacent slats 1, with inserted clips 60 and seal members 3.

As seen best in FIGS. 13-15 the opposite leg clip parts 66a,66b of the second clip leg 66 can, in the mounted state when assembled with a slat 1, be arranged on opposite sides of the second drainage track 23. The gap 68 between the leg clip parts 66a,66b allows water to drain despite the second clip finger 67 is positioned in said second drainage track 23.

Respective foot parts 69a,69b of respective leg clip parts 66a,66b abut the track member 25 of the second elongated hinge member 6 of the slat 1 in the assembled state of slat 1 and clip 60.

Using the clip 61 helps the slat 1 itself keeping an overall square cross-section, and roll-up truck bed cover 70 as a whole keeping an overall, substantially square, configuration and accordingly an unobstructed smooth sliding of said roll-up truck bed cover in opposite guide rails on top of a truck bed. A minor, but acceptable, movement axially of the slats 1 may be present due to tolerance.

To summarize: Both embodiments of slats 1,40 can be assembled/disassembled with respective seal member 3,3' by sliding these parts together lengthwise, but the first embodiment of a slat 1 and the flexible elongated seal member 3' is best assembled/disassembled when the angle between the slats is about 90°.

The present inventions provide three different embodiments of slats having different first elongated hinge member and optionally a reinforcing web. Reinforcing webs can be added t any of the slats and the reinforcing web be left out in the third embodiment of a slats. Any hinge members can be provided on any of the described slat and a corresponding suitable flexible elongated seal member be inserted between adjacent slats.

The hard slat arrays composed of the above described and discussed slats may e.g. be used in the electrically driven truck bed cover and the drive system described in the applicant's international patent application no. PCT/DK2019/050125. The slat designs of the present invention can however be used in other kinds of roll-up truck bed covers and are not limited to use in electrically driven truck bed covers.

The novel slat and slate array design can also be used for both vertical and horizontal covers, such as roll-up doors, shutters and blinds.

The invention claimed is:

1. A slat connecting system for a roll-up truck bed cover comprising an array of a plurality of contiguously arranged elongated slats and a plurality of flexible elongated seal members, wherein the elongated slats are pivotably hinged together, wherein an elongated slat comprises a main slat body having a first elongated edge and an opposite second elongated edge, a first elongated hinge member is provided in the vicinity of the first elongated edge along its length, and a second elongated hinge member is provided in the vicinity of the second elongated edge along its length, the first elongated hinge member of a slat of the array of the plurality of contiguously arranged elongated slats is configured for being pivotably interconnected to the second elongated hinge member of the adjacent slat of said array, wherein the first elongated hinge member has a first coupling groove member having a first groove opening facing away from the second elongated hinge member, the first coupling groove member extends into a coupling hook having a hook opening facing towards the second elongated hinge member, and wherein the first coupling groove member is closer to the main slat body than the coupling hook, the first coupling groove member is disposed at least partly laterally retracted from the first elongated edge below the main slat body and accommodates a part of the flexible elongated seal member which extends between adjacent slats.

2. A slat connecting system for a roll-up truck bed cover according to claim 1, wherein the first elongated hinge member extends from or close to the first elongated edge below the main slat body, the second elongated hinge member extends from or close to the second elongated edge below the main slat body and is spaced apart from the first elongated hinge member.

3. A slat connecting system for a roll-up truck bed cover according to claim 1, wherein the second elongated hinge member has a second coupling groove member having a second groove opening facing away from the first coupling groove member, wherein the coupling hook of one slat is configured to connect pivotably to the second coupling groove member of an adjacent slat.

4. A slat connecting system for a roll-up truck bed cover according to claim 1, wherein the flexible elongated seal member has a first seal section, which via a bridge member extend into a second seal section, wherein the first seal section is configured to engage the first coupling groove member of a first elongated hinge member of a first slat and the bridge member of said flexible elongated seal member is arranged through the first groove opening of said first elongated hinge member, whereby said second seal section protrudes outside the first coupling groove member and abuts a track member of the second elongated hinge member of the adjacent slat, at least when the main slat bodies of said adjacent slats are in substantially the same plane.

5. A slat connecting system for a roll-up truck bed cover according to claim 4, wherein the said track member extends between the second coupling groove member and the interior surface of the main slat body.

6. A slat connecting system for a roll-up truck bed cover according to claim 4, wherein the second seal section of the flexible elongated seal member comprises an inner flange connected to the bridge member, which inner flange extends into a free flange via a narrowed section.

7. A slat connecting system for a roll-up truck bed cover according to claim 6, wherein the width of the free flange is adapted so that a lobe of the free flange extends into a gap between adjacent main slat bodies of adjacent slats, at least when the main slat bodies of said adjacent slats are in the same plane.

8. A slat connecting system for a roll-up truck bed cover according to claim 1, wherein at least one of the first elongated hinge member or the second elongated hinge member extends laterally beyond the width of the main slat body.

9. A slat connecting system for a roll-up truck bed cover according to claim 4, wherein the first coupling groove member has interior coupling ribs and the first seal section has corresponding exterior coupling ribs that fit in the gap between the interior coupling ribs, or vice versa.

10. A slat connecting system for a roll-up truck bed cover according to claim 1, wherein the slat has one or more of
a flat exterior face of the main slat body,
a flat interior face of the main slat body,
a bead or flange at one or more of the first elongated edge, the second elongated edge, an edge of the hook opening, an edge of the first coupling groove member, and an edge of the second coupling groove member,
an enforcing web connecting the first elongated hinge member and the second elongated hinge member and being disposed below the main slat body,
at least one drainage track provided in the first elongated hinge member and/or the second elongated hinge member at, or close to, one or both the free ends of a slat,
the main slat body of a first slat does not touch the main slat body of the adjacent slat, and
the length of the flexible elongated seal member may be equal to the slat length, or the length of the flexible elongated seal member may be selected to be shorter than the length of a slat.

11. A slat connecting system for a roll-up truck bed cover according to claim 1, characterised in comprising a clip adapted to be inserted between the first elongated hinge member and the second elongated hinge member.

12. A slat connecting system for a roll-up truck bed cover according to claim 11, wherein the clip has a main clip body facing the main slat body of the slat when the clip and the slat are assembled, which main clip body has a first clip end configured to engage the first elongated hinge member and an opposite second clip end configured to engage the second elongated hinge member.

13. A slat connecting system for a roll-up truck bed cover according to claim 12, wherein the first clip end has a first clip leg provided by a bend extension of the main clip body, and the second clip end has a second clip leg provided by a bend extension of the main clip body opposite the first clip end.

14. A slat connecting system for a roll-up truck bed cover according to claim 13, wherein at the first clip end the clip has a first clip finger that protrudes from the main clip body, and at the second clip end the clip has a second clip finger that protrudes from the main clip body.

15. A slat connecting system for a roll-up truck bed cover according to claims 13, wherein the second clip leg is bifurcated.

16. A slat connecting system for a roll-up truck bed cover according to claim 14, wherein the first clip finger and/or the second clip finger curves away from the respective clip leg and second clip leg.

17. A slat connecting system for a roll-up truck bed cover according to claim 12, wherein the main clip body is convex and has a convex surface facing the slat when assembled with said slat.

18. A slat connecting system for a roll-up truck bed cover according to claim 14, wherein the first clip finger and/or the second clip finger is configured to engage the at least one drainage track of the slat.

* * * * *